(12) United States Patent
Han et al.

(10) Patent No.: US 7,104,449 B2
(45) Date of Patent: Sep. 12, 2006

(54) METHOD AND APPARATUS FOR PATTERNING CARDS, INSTRUMENTS AND DOCUMENTS

(76) Inventors: Wenyu Han, 5C Marten Rd., Princeton, NJ (US) 08540; Victor Zazzu, 22 Monroe Ave., Belle Mead, NJ (US) 08502

( * ) Notice: Subject to any disclaimer, the term of this patent is extended or adjusted under 35 U.S.C. 154(b) by 805 days.

(21) Appl. No.: 09/745,512

(22) Filed: Dec. 22, 2000

(65) Prior Publication Data

US 2001/0010333 A1 Aug. 2, 2001

Related U.S. Application Data

(63) Continuation-in-part of application No. 09/190,760, filed on Nov. 12, 1998, now Pat. No. 6,193,156.

(51) Int. Cl.
*G06K 7/14* (2006.01)

(52) U.S. Cl. .................. 235/454; 235/487; 235/494
(58) Field of Classification Search ............ 235/454, 235/487–488, 490, 491, 494; 360/60, 59
See application file for complete search history.

(56) References Cited

U.S. PATENT DOCUMENTS

| | | | | |
|---|---|---|---|---|
| 3,648,240 A | * | 3/1972 | Jacoby et al. | 340/5.52 |
| 3,728,521 A | * | 4/1973 | Borough et al. | 235/473 |
| 4,270,153 A | * | 5/1981 | Bejerano et al. | 360/78.02 |
| 4,671,839 A | * | 6/1987 | Finkel et al. | 156/257 |
| 4,683,371 A | * | 7/1987 | Drexler | 235/454 |
| 4,745,268 A | * | 5/1988 | Drexler | 235/454 |
| 4,810,868 A | * | 3/1989 | Drexler | 235/454 |
| 5,446,791 A | * | 8/1995 | Wooley et al. | 235/454 |
| 5,572,589 A | * | 11/1996 | Waters et al. | 705/58 |
| 5,610,884 A | * | 3/1997 | Yanagidate | 235/454 |
| 5,789,733 A | * | 8/1998 | Jachimowicz et al. | 235/380 |
| 5,822,291 A | * | 10/1998 | Brindze et al. | 369/94 |
| 5,959,289 A | * | 9/1999 | Okada et al. | 235/487 |
| 6,070,799 A | * | 6/2000 | Ashe | 369/47.12 |
| 6,259,575 B1 | * | 7/2001 | Thomas et al. | 360/60 |
| 6,392,832 B1 | * | 5/2002 | Oshiki et al. | 360/59 |

* cited by examiner

*Primary Examiner*—Thien M. Le
*Assistant Examiner*—Seung H Lee
(74) *Attorney, Agent, or Firm*—Henry I. Schanzer

(57) ABSTRACT

An instrument (e.g., a card or an optical data storage disc such as a CDROM) embodying the invention includes a pattern formed on or within the instrument, whereby the instrument, when illuminated by a light source, produces a unique output light pattern which can be detected by a photo sensor. The formed pattern may take any number of different and randomly formed shapes ranging from stripes of different size and spacing, as in a bar code, to complex two dimensional shapes and images. The pattern formed between the top and bottom surfaces of an instrument may include randomly distributed light pipes (paths) extending from one side of the instrument to one, or more, other side(s) of the instrument. Alternatively, the pattern formed between the top and bottom surfaces may include a number of "pitted" optical fibers extending from a side of the instrument to a "hidden" region internal to the instrument, which does not extend to any of the sides or surfaces of the instrument. Alternatively, the pattern formed between the top and bottom surfaces of the instrument (e.g., a CDROM) may include opaque optical fibers extending within a region of the instrument. Alternatively, a pattern may be formed on an instrument (e.g., a CDROM) by laser etching or scribing a random pattern on a surface of the instrument.

23 Claims, 20 Drawing Sheets

METHOD AND APPARATUS FOR PATTERNING CARDS, INSTRUMENTS AND DOCUMENTS

CROSS REFERENCES TO RELATED APPLICATIONS

This application is a continuation-in-part of U.S. patent application Ser. No. 09/190,760 filed on Nov. 12, 1998 now U.S. Pat. No. 6,193,156 and a partial divisional of the material disclosed therein.

BACKGROUND OF THE INVENTION

This invention relates to valuable cards, instruments and documents and, in particular to methods and apparatus for patterning or encoding these cards, instruments and documents.

For ease of discussion, the invention will be illustrated using cards such as commonly used plastic cards. However, it should be understood that in the specification to follow and in the appended claims, when reference is made to "cards", instruments and documents are also included, although not specifically identified as such.

Cards of interest may be used, for example, to identify a person or object and/or they may be used as a value card (i.e. a debit card or credit card) to withdraw money from a machine. Because of the value of these cards there are counterfeiters who make "false" cards which attempt to imitate "true" or "valid" cards. To enhance the security of the cards it is known to add additional security "features" to the surface of the cards. These added security features can take the form of a hologram or a spatial dependent optical image or ghost images strategically placed on the surface of the card.

In a certain group of applications the security features are dependent on a person actually checking that the cards' security features are present and/or intact. A problem exists with these applications in that there are many instances where the person responsible for checking the validity of the card, such as a cashier, does not actually look at the credit card and simply mechanically "swipes" the card through a card reader, such as a slot reader. When this occurs, the security features present on the card such as the hologram on the surface of the card and the signature on the back of the card are rendered useless.

It is therefore desirable and/or necessary to develop a more reliable and automatic means for impeding the falsification of a card and to check whether these means are present. To this end, card readers may be used to automatically read or sense the security related information contained on a card to identify whether a card is valid. Also, to increase the security of the cards more features may be added to make it much more difficult to counterfeit these cards. Examples of means for enhancing the security of cards and for sensing (reading) the presence of the enhanced security means are described, for example, in our presently pending patent applications, identified below, the teachings of which are incorporated herein by reference: (a) Multi Sensor Information Reader filed on Apr. 7, 1998 and bearing Ser. No. 09/056,134, and (b) Method And Apparatus For Impeding The Counterfeiting Of Cards, Instruments And Documents filed May 26, 1996 and bearing Ser. No. 09/084,844.

A disadvantage of increasing the number of security features placed on the top and bottom surfaces of a card is that it uses up valuable space, which many card manufacturers would prefer to use for advertising. This disadvantage is overcome in cards made in accordance with the invention.

SUMMARY OF THE INVENTION

A card embodying the invention includes a pattern formed between the top and bottom surfaces of the card, whereby the card, when illuminated by a light source, produces a unique output light pattern which can be detected by a photo sensor.

Generally, the pattern may take any number of different shapes ranging from stripes of different size and spacing, as in a bar code, to complex two dimensional shapes and images. The pattern formed between the top and bottom surfaces of a card may include light pipes (paths) extending from one side of a card to one, or more, other side(s) of the card. Alternatively, the pattern formed between the top and bottom surfaces may include a bundle of optical fibers extending from one side of a card to one, or more, of the other sides of the card. Alternatively, the pattern formed between the top and bottom surfaces of the card may include light pipes or optical fibers extending between these two surfaces. Alternatively, an image may be embedded between the top and bottom surfaces.

Certain of the cards embodying the invention may be illuminated from the top or the bottom surface to produce an output light pattern along at least one edge of the card. These cards will normally be formed such that the illuminated surfaces are formed of translucent material.

Other cards embodying the invention may be illuminated along one of their edges to produce an output light pattern along another edge. These cards may be formed with opaque top and bottom surfaces.

Certain other cards embodying the invention may be illuminated along a selected one of their edges to produce an output light pattern along another edge and to also produce an output light pattern out of one (or both) of the top and bottom surfaces of the card. In this case the surface from which an output light pattern is produced would be formed of a translucent material.

Still other cards embodying the invention may be illuminated from the top or the bottom surface to produce an output light pattern at the other surface. In this instance both the top and bottom surfaces would be formed of translucent material.

A reader embodying the invention includes means for illuminating a selected card in a predetermined manner and includes sensing means for reading and recognizing the output light pattern. In a particular embodiment of the invention, a reader illuminates a card which includes a pattern of light paths formed within the card, between the top and bottom surfaces thereof, for producing a predetermined light pattern at an edge of the card when the light paths are illuminated. In some embodiments the light paths extend from one side (extending between the top and bottom surfaces) of a card to a second side of the card. When light is applied to the one side of the card, a light pattern is produced at the second side so that the pattern can be sensed. In other embodiments of the invention the light paths extend from one of the two surfaces of the card to a side of the card. The one surface of the card is then illuminated and the light pattern produced at the side of the card is sensed. Still further the light paths may be patterned such that the spacing between the light paths is predetermined and/or the size of each light output site may be predetermined. In certain embodiments of the invention the light paths are formed using optical fibers.

An advantage of cards made in accordance with the invention is that a significant amount of coded information may be produced without requiring space on the top and bottom surfaces of cards. Leaving the top and bottom surfaces of a card free is significant because these areas are precious real estate used by many card manufacturers as advertising space.

An instrument (e.g., a card or an optical data storage disc such as a CDROM) embodying the invention includes a pattern formed on or within the instrument, whereby the instrument, when illuminated by a light source, produces a unique output light pattern which can be detected by a photo sensor. The formed pattern may take any number of different and randomly formed shapes ranging from stripes of different size and spacing, as in a bar code, to complex two dimensional shapes and images. The pattern formed between the top and bottom surfaces of an instrument may include randomly distributed light pipes (paths) extending from one side of the instrument to one, or more, other side(s) of the instrument. Alternatively, the pattern formed between the top and bottom surfaces may include a number of "pitted" optical fibers extending from a side of the instrument to a "hidden" region internal to the instrument, which does not extend to any of the sides or surfaces of the instrument. Alternatively, the pattern formed between the top and bottom surfaces of the instrument (e.g., a CDROM) may include opaque optical fibers extending within a region of the instrument. Alternatively, a pattern may be formed on an instrument (e.g., a CDROM) by laser etching or scribing a random pattern on a surface of the instrument.

BRIEF DESCRIPTION OF THE DRAWINGS

In the accompanying drawing like reference characters denote like components.

FIGS. 2D1 and 2D2 are side views of cards embodying the invention;

DETAILED DESCRIPTION OF THE INVENTION

Applicants' invention resides, in part, in the recognition that an existing technology could be modified and adapted to produce cards which could be encoded and/or patterned without the necessity of using up the surface area of the cards.

Figure 1:
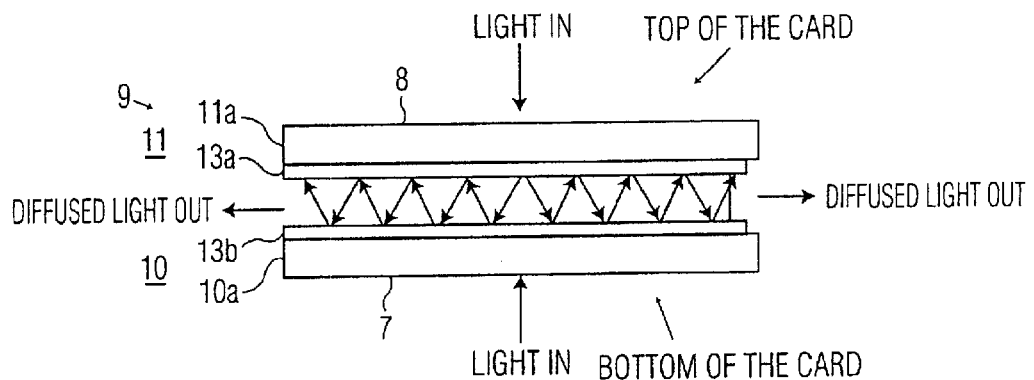
FIG. 1 is a cross-sectional diagram of a prior art card including a light path.

FIG. 1 shows a cross section of a prior art multi-layered card 9 formed such that the top and bottom layers of the card are spaced from each other to define a channel through which light can pass. The card includes a bottom layer 10 and a top layer 11. Each one of layers 10 and 11 includes an outer layer 10a, 11a, respectively, made of a translucent material. Outer layers 10a, 11a, have an outer surface 7,8, respectively. Each one of layers 10 and 11 also includes an inner layer on which is formed a semi-reflective layer 13a, 13b, respectively, spaced from each other. The semi-reflective layer may be an aluminum compound or an acrylic, or any like material. Light projected onto either one of the outer surfaces (7,8) of the card is captured between the reflective layers and travels between layers 13a and 13b of the card until it is emitted as a diffused light output along the side or edge of card 9. This method uses what may be termed edge glow technology. That is, this technology uses a light reflective space formed between the two (top and bottom) surfaces of the card so as to transmit light that has been projected onto the outer surfaces of the card and entered the card, and the light is transmitted towards the edge of the card in a diffused manner. This allows the edges of the card to glow.

As light enters the card from either the top or bottom, the light will remain trapped within the semi-reflective material until it can escape from the edges of the card. As the light escapes from the edge of the card the edges of the card will appear to glow. This glowing phenomena can be seen, for example, by illuminating the card with a small flashlight and then visually looking at the edge of the card. To view the light coming out of the edges of the card someone has to actually look at the edge of the card to see if it is present.

The light outputted from the edges of a card formed in accordance with the prior art teaching is diffused and is not of significant use. However, as discussed below, Applicants recognized that the space between the top and bottom surfaces could be coded and/or patterned such that, when illuminated, a significant amount of coded information could be provided.

Figure 2A:
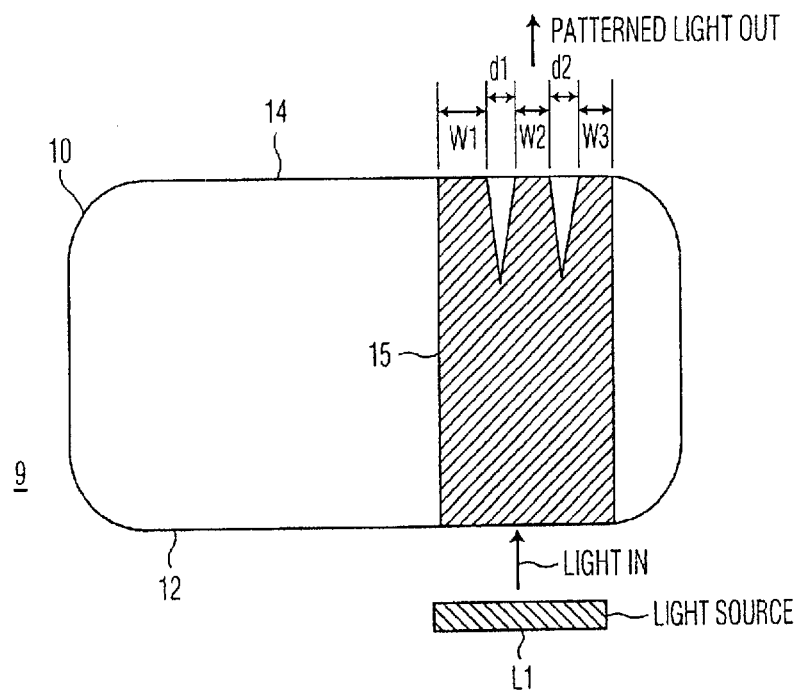
FIGS. 2A, 2B and 2C are cut-away views of cards formed with different light patterns in accordance with the invention.
Figure 2B:
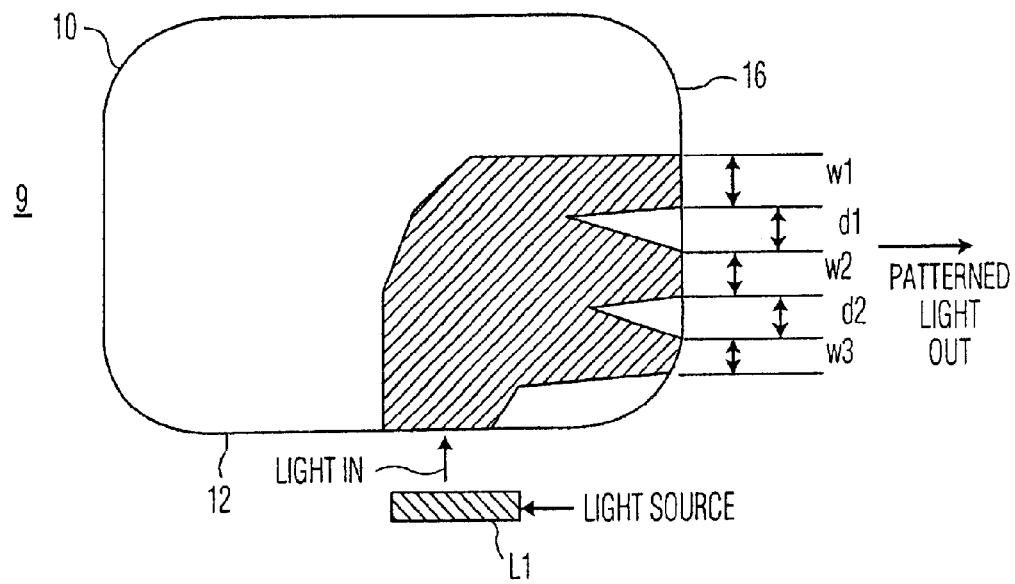
Figure 2C:
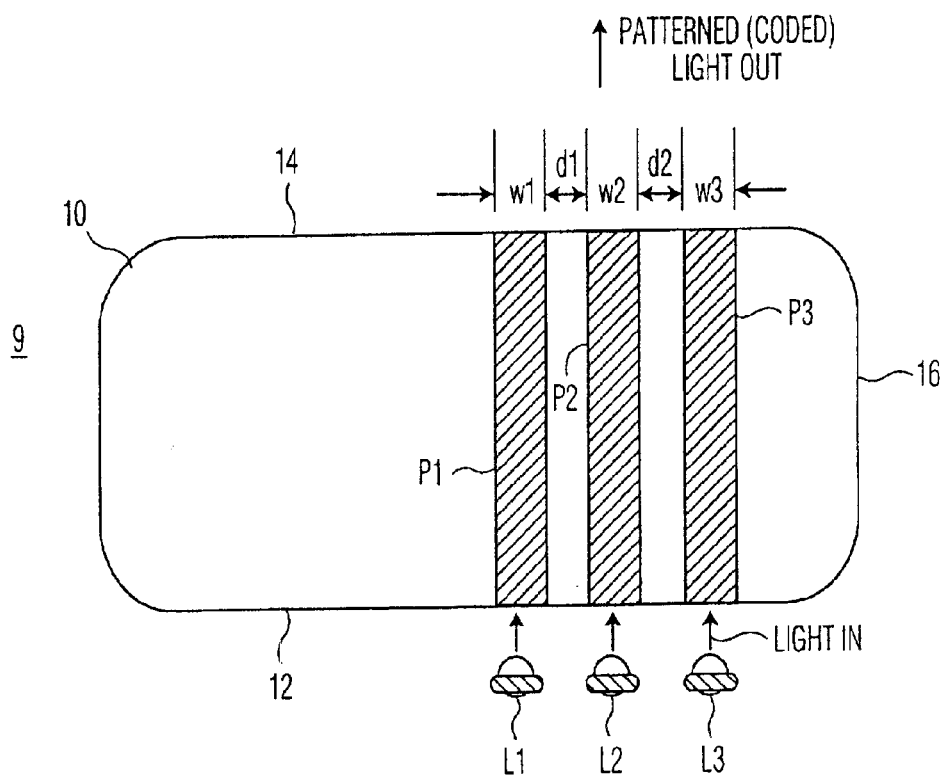

In FIGS. 2A, 2B and 2C, cards formed in accordance with the invention include light pipe patterns formed within the cards (between its top and bottom surfaces) for producing a predetermined output light pattern at an edge of the cards. That is, when a light pipe pattern is illuminated by a light source, a predetermined output light pattern is produced at the edge (side) of the card. The pattern can then be sensed or read by means of a series of electronic sensors and detectors which can accurately measure the output light pattern being emitted at the edge of the card.

Figure 3:
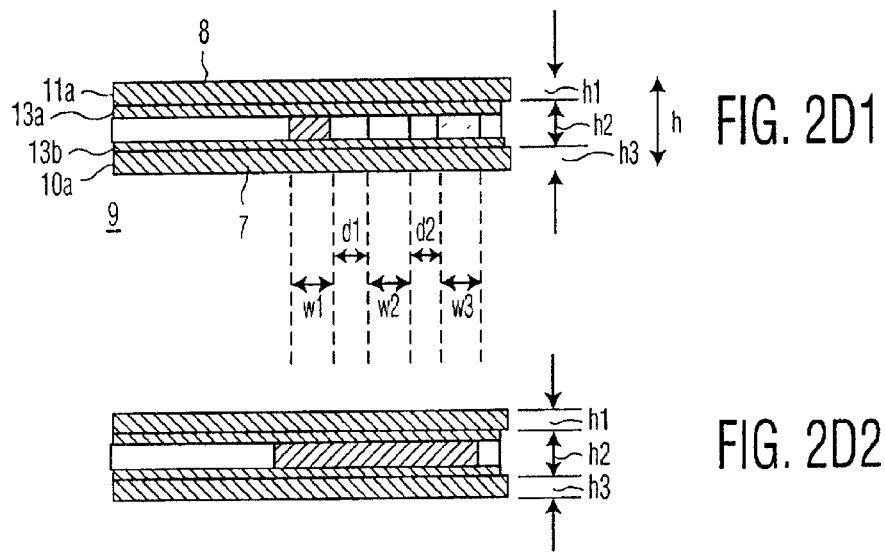
FIG. 3 is a cut-away view of the top of a card formed, in accordance with the invention, being illuminated by a light source and with its output pattern being read.
Figure 3:
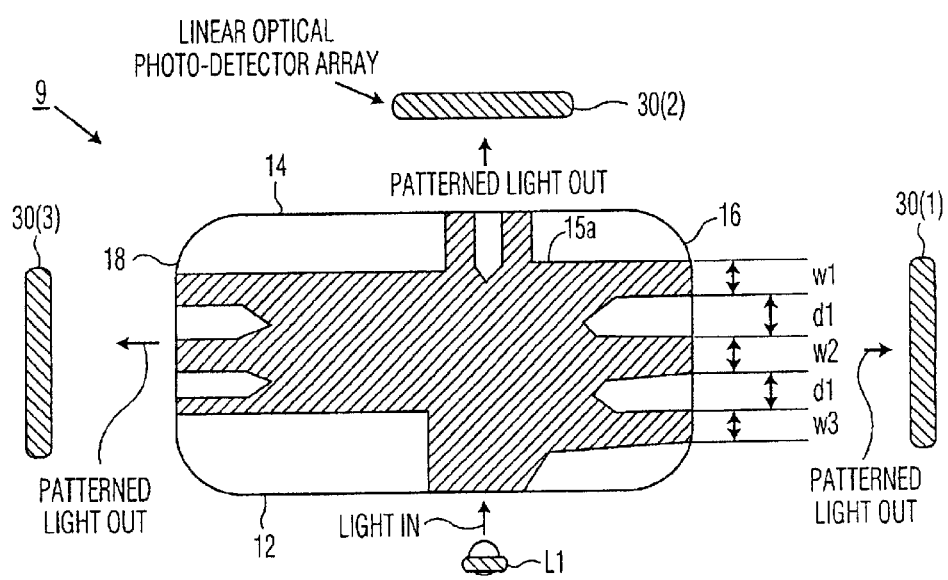

FIGS. 2A, 2B and 2C show three different light pipe patterns formed within a card. In FIG. 2A shows a top view of the lower layer of a card containing a light pattern formed so as to extend from one side 12 of the card 9 and across the width of the card to the opposite side 14. FIG. 2B shows a top view of the lower layer of a card, 9, containing a light pattern which extends from one side 12 to another, adjacent, side 16, at a right angle to side 12. In FIGS. 2A and 2B the patterns may use one illumination source (as shown in FIG. 3) where the input light is projected so as to enter the edge (side) 12 of the card and the light energy is dispersed within the light pipe and then transmitted to three output sites. The light source may be a light emitting diode (LED) or any other suitable light source. For ease of illustration, in the discussion to follow, reference is made to visible light. However, it should be understood that in many embodiments of the invention, non-visible light (e.g., ultraviolet and infrared light) may be used. As shown in FIGS. 2A and 2B, the width (W1, W2, W3) of each output site, as well as the spacing (d1, d2) between the various output sites, may be controlled (varied) in accordance with a code or program to render the cards more secure. In FIG. 2C, three separate and independent light pipes (P1, P2, P3) are formed between the top and bottom surfaces of the card. Each light pipe can then be illuminated with a different color LED (L1, L2,L3) and then detected with a color sensitive detector array. A reader to read the cards would require that the reader be used to illuminate the cards and be programmed or designed to operate with these cards.

FIG. 2D1 shows a side view looking into the light output side 14 of the card 9. The card 9 may have a total thickness or height (h) of approximately 30 mils. FIG. 2D2 shows a side view looking into the light input side 12 of card 9. The top and bottom surfaces, 11a and 10a, respectively, may each have a height of 10 mils and the coded light pattern is formed within a space also having a height of 10 mils. It should be appreciated that these values are by way of example only and that the height of each layer may be made substantially greater or smaller, so long as the total height meets the general standards required of the cards.

FIG. 3 illustrates that a light pipe (path) pattern 15a may be formed on a card 9 such that light may be inputted on one side, 12, and a different output light pattern may be produced on the other three sides (16, 14 and 18) of the card. FIG. 3 also illustrates that a single light source, L1, may be used to illuminate the back end of the light pipe patterns shown in FIGS. 2A and 2B and that the input light energy is evenly dispersed and distributed to each of the three output sides, 14, 16, 18, depicted in FIG. 3. The light output emitted from each of the output sides then may be detected by an array of optical photodetectors, 30(1), 30(2) and 30(3). The photodetectors (or sensors) are used to measure the parameters associated with the output illumination of the light pipes (i.e., the widths W1, W2, W3 and the distances d1, d2). If the characteristics of the light received at each location are not within the specification then the card is determined to be false. Again, the reader to read these cards is programmed and/or designed to work/function with the cards. As discussed below, a reader embodying the invention would include means for activating a light source and projecting the light along the edge (side) of the cards shown in FIGS. 2A, 2B, 2C and 3, and would also include photosensors for sensing the output light pattern ("coded" light output). The reader would also include decoding processing and memory circuitry for comparing the sensed information versus previously stored information to determine the validity of the cards.

Figure 4:
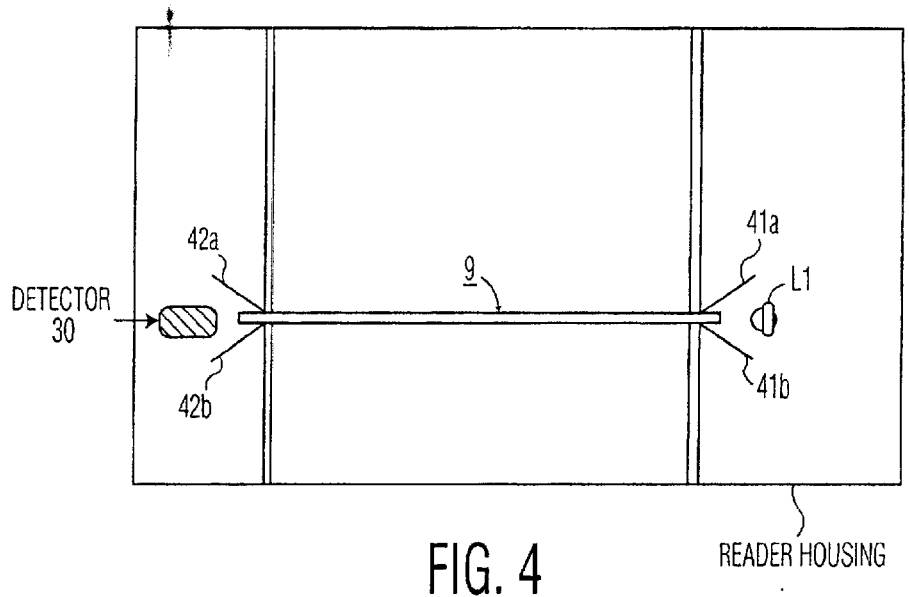
FIG. 4 is a cross-sectional view of a card embodying the invention mounted on a reader and being illuminated and its light output being detected in accordance with the invention.

FIG. 4 shows a cross-section of the illuminator/detector system for a card mounted in a reader housing. The reader provides a light source 4 which would project input light onto, and into, one side of the card and a photodetector, 30, for sensing the light output from another side (opposite or adjacent to the one side). Note that the illuminating system would include a light shade (41a, 41b) at the light input end to prevent illumination from the LEDs from skipping (passing) over the edge of the card and interfering with the detector. Likewise, the reader would include light shades (42a, 42b) at the light output end to allow the detector to only detect light output from the edge (side) of the card.

Figure 5:
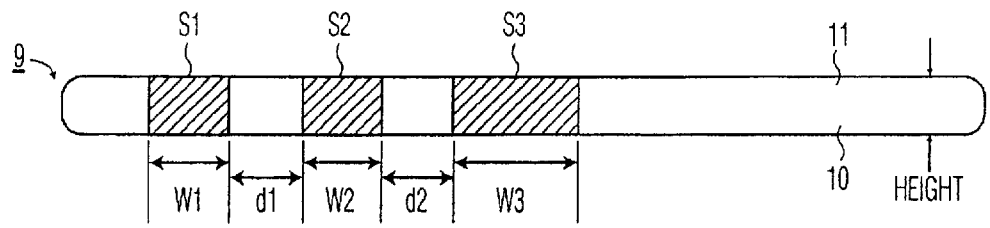
FIG. 5 is a side view of a card embodying the invention.

FIG. 5 shows a side (edge) of the card illustrating three site locations (S1, S2, S3) from which the light energy exits the card, 9. One method used to detect if the card has been falsified is to check the width (W1, W2, W3) of the light emitted from the various location sites and the width or distance (d1, d2) between the various site locations defining opaque areas. Similar to detecting conventional bar codes, the above detection scheme will be able to measure the precise illumination areas and the precise opaque areas. Techniques for detecting this type of information is known and need not be detailed.

In FIGS. 2A, 2B, 2C and 3, the top and bottom surfaces (10, 11) of the cards may formed of an opaque material since the light output pattern is produced at one edge of the card by illuminating another edge of the card.

The light pipes can be made of a material that will only transmit a narrow frequency band (e.g., red, green or yellow). The optical detector will only then validate the card if the signal contains both the correct widths and the predetermined spectra.

Of course the bar/space pattern can be adjusted for each specific customer application. This will allow this technique to have a unique pattern (illumination/opaque) ratio for each application.

In the discussion above, the cards were intended primarily for use in what are known in the art as "insertion readers", including manual or motorized insertion readers.

Figure 6A:
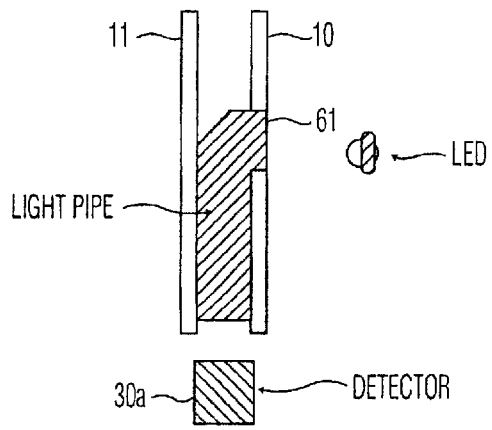
FIGS. 6A and 6B are, respectively, a side view and a front view of a card embodying the invention with either one of its top and bottom surfaces being illuminated.
Figure 6B:
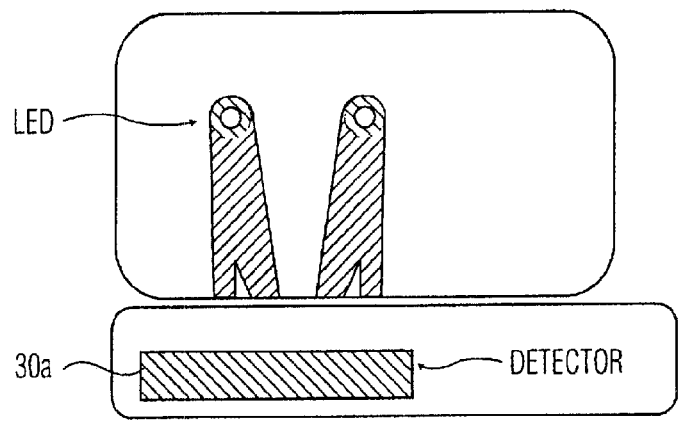

In a different embodiment of the invention the light pipe formed in a card does not extend the entire length (or width) of the card. FIGS. 6A and 6B show different views of a card. In FIG. 6A, which is a cross-sectional diagram, the light pipe extends only partially along the width on the length of the card. That is, the light pipe extends from one of the major surfaces of the card to one of the sides of the card. The light pipe is illuminated from one of the top and bottom surfaces and the light is bent at a 90 degree angle and directed towards one edge of the card; where the output light signal is then detected by a detector 30a. The embodiment of FIG. 6A enables the detection of security features by means of a reader, 101, shown in FIGS. 6C and 6D which uses a manual "swipe" technique (e.g., slot or "swipe" reader). In a manual "swipe" application, the card 9 is typically held in the hand of a user and the lower portion of the card is then inserted and swept through the reader 101.

Figure 6C:
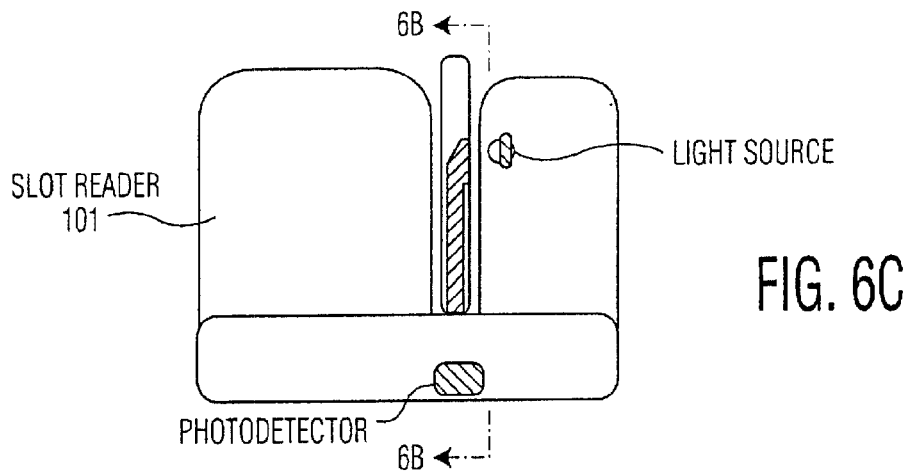
FIGS. 6C and 6D are respectively a side view and a front view of a slot reader with a card embodying the invention.
Figure 6D:
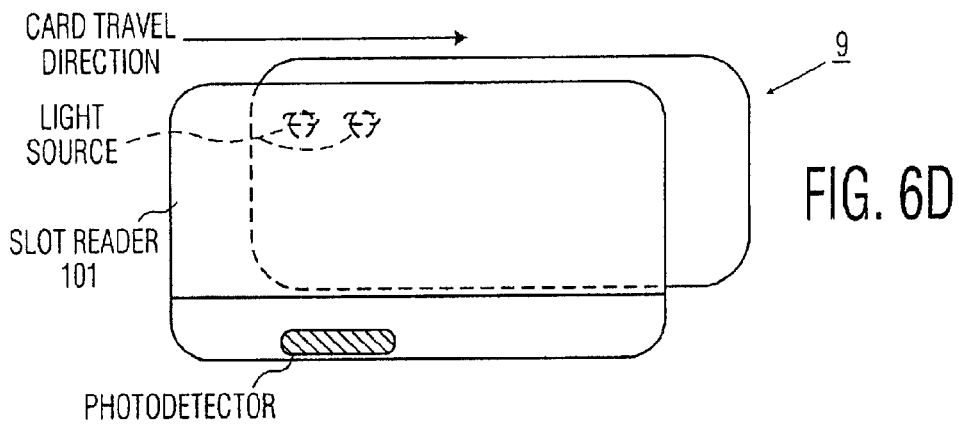

As shown in FIG. 6C, as the card is passed through a slot reader, the LEDs will illuminate one surface of the card and cause light to be projected via holes or cut-aways 61. When the LEDs align with the input to the light pipe, the detector 30a will detect the output light pattern produced at the edge of the card. If the light pattern at the edge of the card matches an appropriate configuration, previously stored or programmed in the reader, then the card will be deemed to be valid. In FIG. 6A, when the card surfaces are made opaque, the cut-out 61 to let light in is required. However, note that when the card surface (e.g., surface 10 in FIG. 6A) is made of a translucent material, there would be no need for holes or cut-aways 61.

Figure 6E:
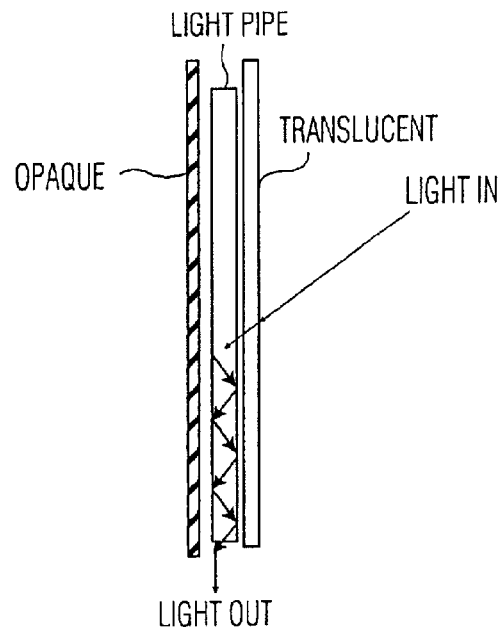
FIG. 6E is a cross-section of a card embodying the invention.

Of course, the position of the light and the detector can be interchanged. Thus, in the embodiment shown in FIG. 6A, the one surface 10 of card 9 would be translucent while the other surface 11 could either be opaque or translucent, as shown in FIG. 6E. This is true for all of the embodiments of this invention.

In the discussion above, energizing the light pipe pattern was accomplished by illuminating one end of a light pipe and reading the light output produced at the other end.

Figure 7A:
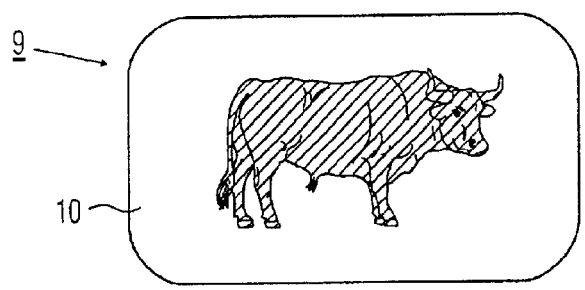
FIG. 7A is a front view of a card embodying the invention.
Figure 7B:
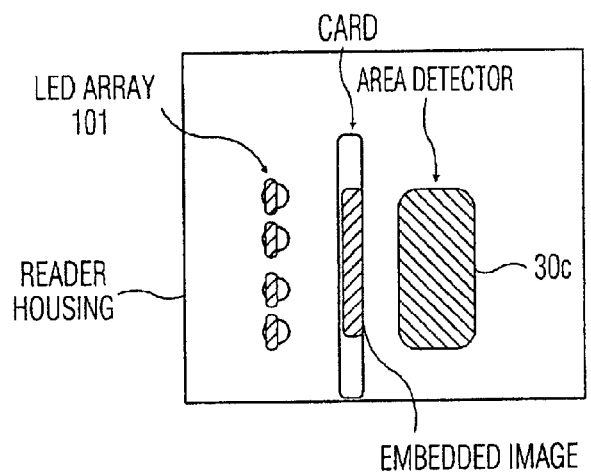
FIG. 7B is a side view of the card of FIG. 7A being illuminated in accordance with the invention.

However, it is within the ambit of the invention to have an embodiment of the invention in which a pattern is completely embedded within a card, as shown in FIG. 7A. In this example, the picture of a bull is completely embedded within the card. That is, the pattern is placed between the top and bottom surfaces of the card. As shown in FIG. 7B, the card will be placed in a reader housing such that the light is incident on one side of the card and an area detector 30c is placed on the other side of the card. As the card is inserted into a validation machine (reader), the LEDs illuminate one side of the card which is made of a translucent material. Light will, therefore, pass through the card. However, in the area where the "image of the bull" is located the light will not pass through. The presence or absence of light can then be detected by an area sensor 30C such as a CCD area sensor. If the embedded image matches the preprogrammed security image stored in the reader, the card is deemed valid.

Figure 8A:
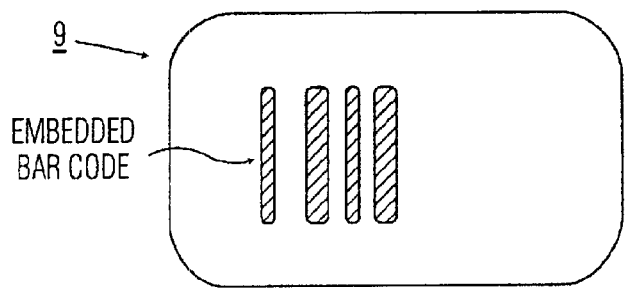
FIG. 8A is a front view of a card embodying the invention with embedded bar codes.

FIG. 8A shows an embodiment of the invention where a bar code is embedded between the top and bottom surfaces of a card. In FIG. 8A, the card material is selected so that when light is projected onto the top or bottom surface, the embedded bar codes block the light while light passes between the bars. In this embodiment, the top and bottom layers of the card would be made translucent.

Figure 8B:
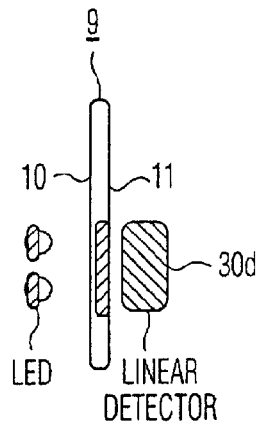
FIG. 8B is a side view of the card of FIG. 8A being illuminated and read in accordance with the invention.

FIG. 8B shows the basic elements needed to read the embedded bar code of FIG. 8A. A number of LEDs can be positioned opposite one surface so as to project their light onto a surface 10 of the card 9. A linear array of photosensors 30d mounted facing the other surface 11 of card 9, can sense the light passing through the card. This will allow the detector to be a linear photosensor as opposed to a more expensive area sensor. The linear and/or area sensors could be charge coupled devices (CCDs) or any suitable sensor. The image or bar code can be opaque with the top and bottom layers of the card being translucent or, vice versa, the image may be translucent and the surrounding area being opaque. Thus, in the embodiments shown in FIGS. 7A, 7B, 8A and 8B, light can be projected onto one surface of a card in which a pattern is embedded and a patterned (or coded) light output is produced at the other surface. The patterned or coded light output can then be sensed or read by means of photosensors which can then provide signals to known detecting and processing circuits.

Figure 9A:
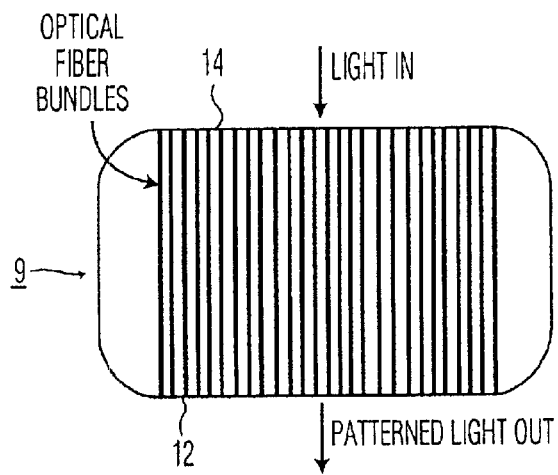
FIGS. 9A and 9B are front views of cards embodying the invention formed with fiber optic bundles.

FIG. 9A illustrates an embodiment of this invention where the card is manufactured with a set of optical fibers embedded between the top and bottom surfaces of the card, 9. In FIG. 9A, a multiplicity of fiber optic light pipes (a fiber optic bundle) are shown distributed across the width of the card. The layer of fiber optics could also be placed across the entire length of the card or from one side to an adjacent, perpendicular, side. In FIG. 9A, a light source would illuminate one side (edge) of the card as shown by the arrow marked "LIGHT IN" and a light output would be produced at another side (edge), as shown by arrow marked "PATTERNED LIGHT OUT". In this embodiment, different ones of the optical fibers could be selected to have different colors or to pass different wave lengths. Also, the spacing of the optical fibers could be made to vary.

It should be noted that a card may be personalized (customized) by, for example, breaking the fiber strands with a laser. In doing so each card can be personalized to have its own unique pattern, as shown in FIG. 9B.

Figure 9B:
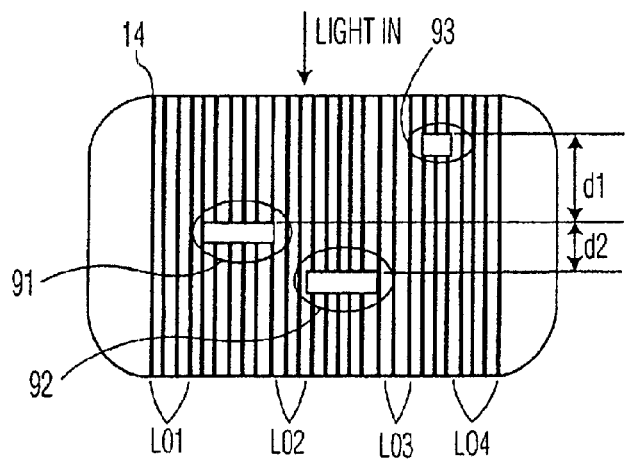

As shown in FIG. 9B, selected groups of fiber optic strands may be cut (i.e. vaporized) with a laser (or by any other suitable means), as shown by the black stripes 91, 92 and 93 in FIG. 9B. Therefore, the broken strands of optical fibers will not carry light from the light input end of the card to the light output end. In this embodiment, all the fibers could be made identical in terms of their transmissive properties. By cutting selected groups of fiber optic strands a unique pattern can be produced and subsequently detected. However, in FIG. 9B, if the top or bottom surface of the card is translucent, the light input will produce light "marks" at 91, 92 and 93. Therefore, an area reader positioned over a surface of the card for sensing the light emitted at the surface of the card could be used to identify the presence of a light output pattern on the surface of the card.

Figure 9C:
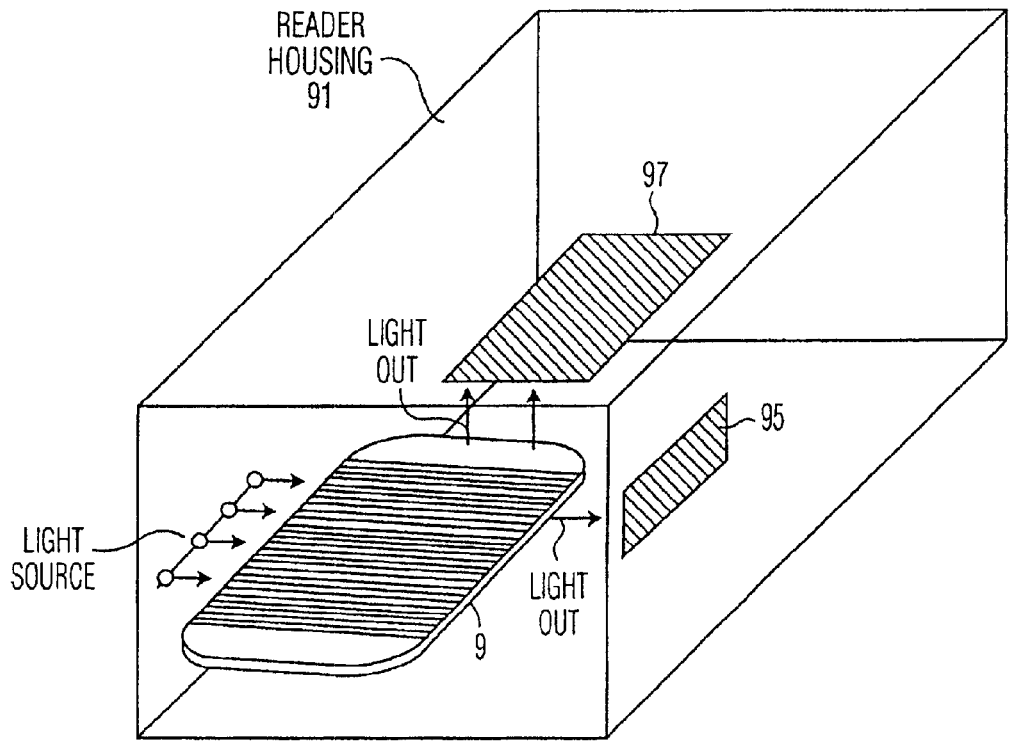
FIG. 9C is an isometric of a reader for reading a "fiber optic" card embodying the invention.

As shown in FIG. 9C, a reader 91 capable of reading a card of the type shown in FIGS. 9A and 9B includes a light source to illuminate one edge of the card with an optical detector 95 located along a different edge and another optical detector 97 to read one of the surfaces of the card. The detector 97 is then programmed to scan the surface area of the card and to detect where the laser has burned the end of the fiber bundles. As the light leaks out of the end of the fiber bundle that is embedded within the card, it is possible to detect the location where the fibers have been burned. Then the distance between each of the laser cuts (d1 and d2) can be calculated and the information can then be stored on an information storage media on the card (such as a magnetic stripe or an integrated circuit memory).

Figure 9D:
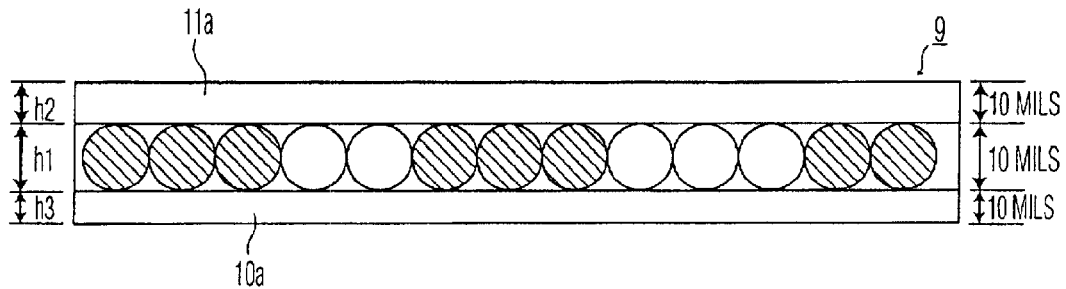
FIG. 9D is a cross-sectional diagram of a fiber optic card embodying he invention.

FIG. 9D is a side (cross-sectional) view of the card 9 showing an illuminated pattern. Note that the optical fibers are shown placed side by side. However, they could as well be spaced from each other. FIG. 9D shows that the fibers could be of 10 mils in diameter sandwiched between a top layer 11a and a bottom layer 10a. In the example of FIG. 9D, the height of the package is approximately 30 mils. However, it should be appreciated that the size of the optical fibers and the thickness of the top and bottom layers may be varied considerably.

Figure 10A:
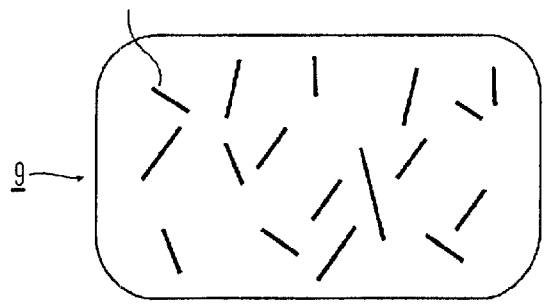
FIG. 10A is a top view of another card embodying the invention.
Figure 10B:
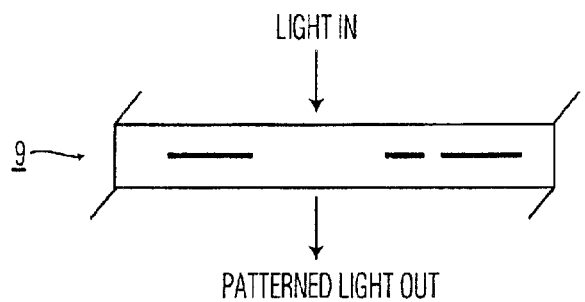
FIG. 10B is a side view of a card of the type shown in FIG. 10A.

FIG. 10A illustrates yet another embodiment of the invention. The card of FIG. 10A may be formed by randomly placing optical fibers of different shapes, sizes and colors and/or randomly forming patterns of like colored optical fibers between the two surfaces of a card. The random pattern created can be read, sensed and recorded and then assigned to a particular individual as his signature or finger print card. The patterns of FIG. 10A, formed randomly, as suggested, would be read as shown in FIG. 10B by illuminating one surface and sensing the patterned (coded) light out.

The fingerprint parameter can be stored on an information storage media such as a magnetic stripe or an IC memory located on the card. When the card is inserted into the validation reader, the unique fingerprint must match the data stored in the card to validate the card. Otherwise, the card will be rejected as invalid.

Figure 11A:
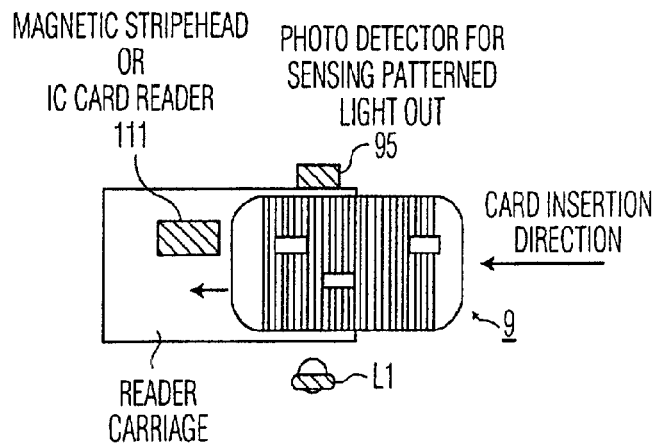
FIGS. 11A and 11B are a top and side view, respectively, of an insertion reader for reading cards embodying the invention.
Figure 11B:
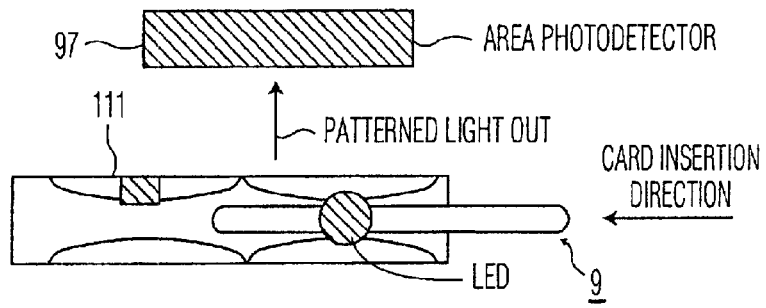

As noted above, readers/scanners to illuminate the smart "light cards" embodying the invention and to sense the light pattern output may include an insertion reader (motorized or manual) or a slot reader, as shown in FIGS. 11A and 11B.

FIG. 11A is a top view of an insertion reader showing an optical fiber type card 9 being inserted into the reader carriage with a light L1 illuminating one side of the card and a photodetector 95 for sensing the light pattern outputted on the opposite side of the card. The reader may include an optimal magnetic stripe head or integrated circuit (IC) card reader 111. FIG. 11B is a side view of the reader showing an area photodetector 97 overlying the card 9 to sense the light pattern output emitted from the surface of the card.

It should be evident that the patterning and encoding of cards, as taught herein, may be combined with other prior art security enhancing means for rendering cards embodying the invention even more difficult to counterfeit.

Figure 12:
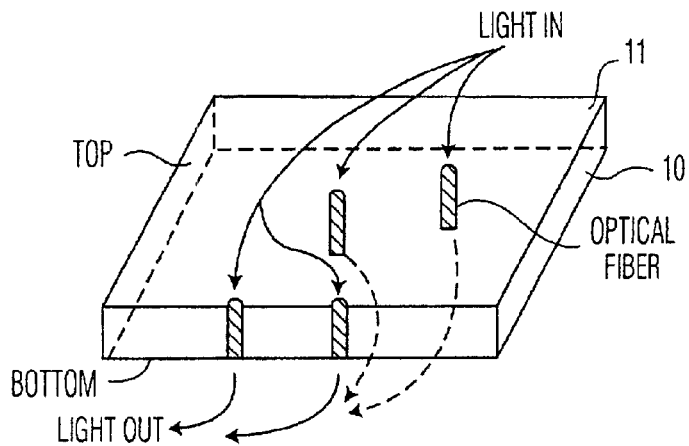
FIG. 12 is a top view of still another card embodying the invention.

FIG. 12 is a not to scale isometric drawing of a card (or other instrument) to illustrate that optical fibers and/or light pipes defining a predetermined pattern (or used to form a pattern) may be mounted parallel to the sides of the cards. A light input signal is then applied to one of the major surfaces of the card (e.g., the top surface) and a patterned (or coded) light output signal is produced at the other one of the major surfaces of the card (e.g., the bottom surface). The card could be any other instrument such as a CD ROM or disc.

It should be appreciated that the various embodiments of this invention could be incorporated into documents such as passports or visas.

Figure 13:
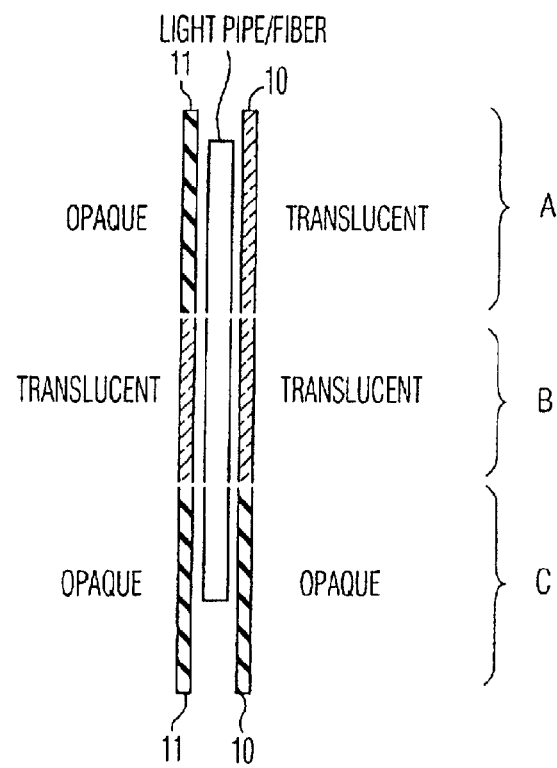
FIG. 13 is a conceptual diagram of a different card construction in accordance with the invention.

It should also be appreciated that, as shown in FIG. 13, cards, instruments and documents embodying the invention may include a light pipe or optical fiber sandwiched between two surfaces. Depending on the application, the surfaces may both be opaque, may both be translucent, or one may be opaque and the other translucent.

Figure 14A:
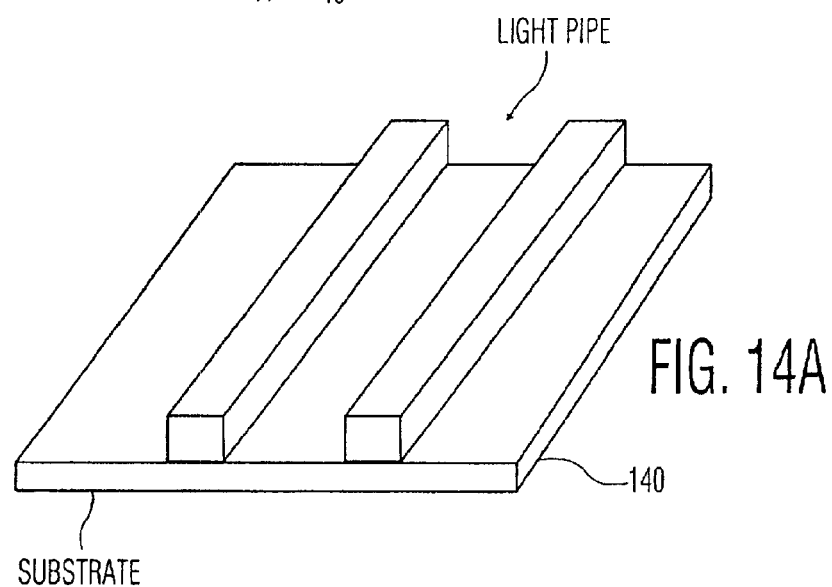
FIGS. 14A and 14B illustrate a method of forming cards embodying the invention.
Figure 14B:
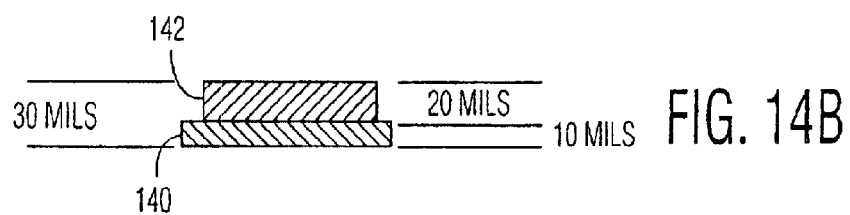

As shown in FIGS. 14A and 14B, it should be appreciated that cards embodying the invention may be formed by first taking a substrate material 140 which may be opaque or translucent and which will eventually form the top or bottom surface of a card. The substrate material will normally have a thickness in the range of 1 to 15 mils, However, for purpose of illustration it is shown to be 10 mils in these figures. An acrylic material 142 may then be formed on top of the substrate, as shown in FIG. 14B. The material 142 may then be patterned by any known techniques to produce a light pipe as shown in FIG. 14A. A cover (not shown) may then be placed over the pattern previously formed to produce a card embodying the invention. It should be appreciated that this is by way of illustration only and any suitable means for making and encoding the space between the top and bottom surfaces of the card is within the scope of the invention.

Figure 15:
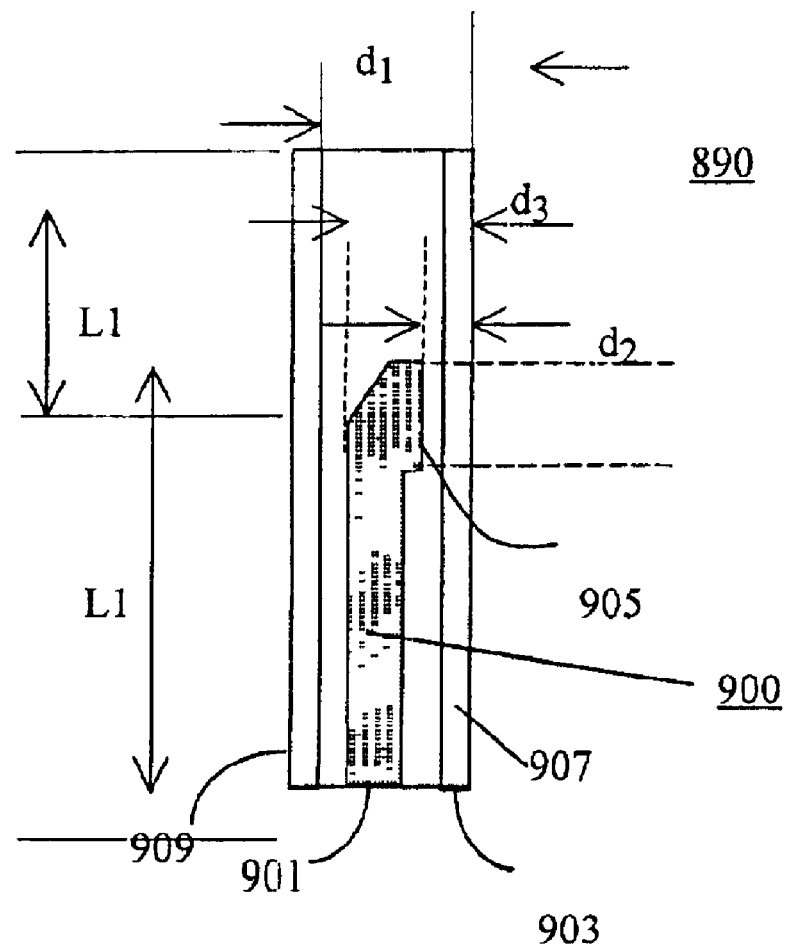
FIG. 15 is a cross-sectional view of a card containing a "hidden" light pipe.

FIG. 15 shows a cross-section of a card 890 containing "hidden" light pipe 900. The pipe is "hidden" in that while one end 901 of the light pipe terminates along one edge 903 of the card (and may be seen), the other end 905 of the light pipe terminates below the surface 907 of the card (and is therefore not readily visible). Assume, for example, that the distance, d1, between the top surface, 907, and the bottom surface, 909, of the card is equal to 30 millimeters and that the diameter of the light pipe 900 is equal to 10 millimeters. The light pipe 900 may be placed so that, for example, the end 905 of the light pipe is between 5 and 10 millimeters below the surface 907 of the card. This allows for sufficient room to bend the light pipe and to have the pipe extend down so the end 901 of the light pipe abuts the lower edge 903 of the card. Note that the "hidden" end 905 of the light pipe may be placed at any arbitrary point between lower edge 903 and the upper edge 911 of the card; i.e., the relative distances L1 and L2 shown in FIG. 15 may be varied over the full width (or length) of the card. In the side view of FIG. 15, only one light pipe is shown. It should be evident that numerous pipes may be formed between the top and bottom surfaces, as shown, for example, in FIG. 17B. It should also be observed that the light pipes may terminate in an internal "hidden" region 951a.

When the card is formed with "hidden" pipes, the information pertaining to the pipes and their location may be encoded on a magnetic stripe, a bar code or a semiconductor device located on the card.

Figure 16A:
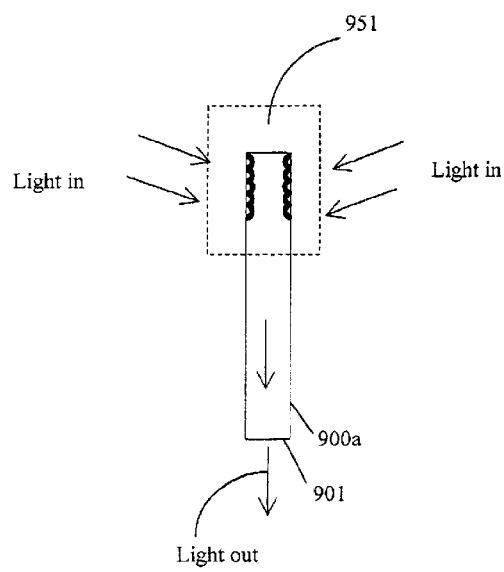
FIGS. 16A and 16B illustrate the use of "pitted" optical fibers for use in cards embodying the invention.
Figure 16B:
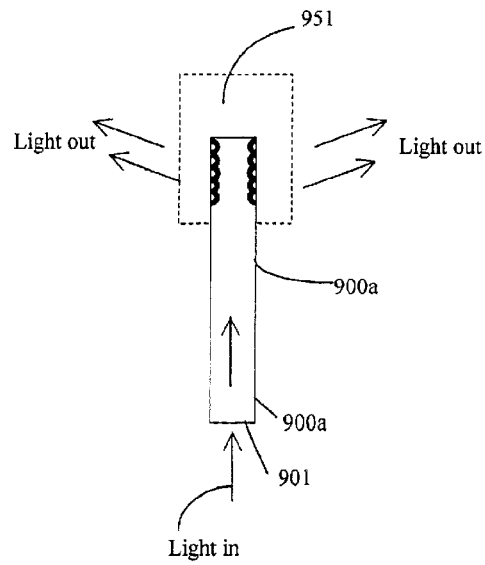

FIGS. 16A and 16B show the use of light pipes or optical fibers, 900a, having a region 951 where the surface of the light pipe or fiber is (chemically or via laser) etched to produce "pits" in the surface of the light pipe or optical fiber, 900a. The pitted regions 951 enable light to enter the pipe/fiber 900a via the region 951 and to be collected and transmitted along the pipe/fiber 900a to the other end 901 where it is emitted, as shown in FIG. 16A. Alternatively, as shown in FIG. 16B, light can enter the end 901 and be transmitted along the pipe/fiber 900a until it reaches region 951, where it is then emitted.

Figure 17A:
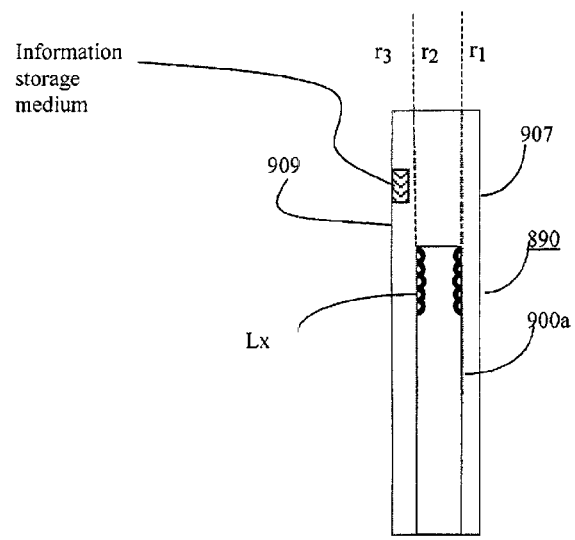
FIG. 17 is a cross-sectional view of a card with a "hidden" pitted optical fiber.
Figure 17B:
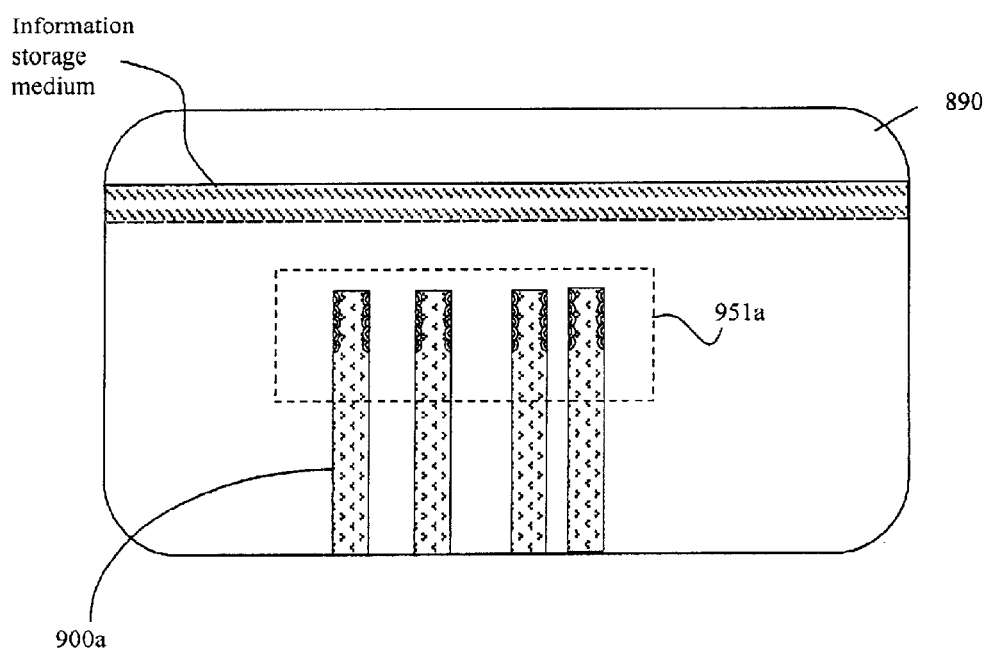

The optical fibers 900a shown in FIGS. 16A and 16B may be used to produce a card of the type shown in FIGS. 17A and 17B. FIG. 17A illustrates that an etched optical fiber 900a may be placed between the top and bottom surfaces of a card 890 so as to either receive or emit light at a point Lx along the width (or length) of the card. FIG. 17B illustrates that the etched "hidden" fibers may be used to form intricate patterns. In the manufacture of the card 890 (See FIG. 17A), one layer 907 and the adjacent region r1 may be translucent to permit light to pass through and the other layer 909 and the adjacent region r3 may be opaque to block the passage of light. Alternatively, both layers 907, 909 and both regions r1 and r3 may be translucent.

Light pipes 900a having different frequency (spectral) responses may be used and randomly or arbitrarily disposed within the card to produce a random or arbitrary response. Alternatively, the light pipes 900*a* having different responses may be used and disposed within the card in a predetermined and or programmed manner to produce a predetermined response.

When a card is formed the resulting pattern may be sensed and corresponding data may then be recorded on an information storage medium located on the card. The recording may then be either:

(a) encoded on the card [by means of a magnetic stripe, a bar code, or an integrated circuit (IC) formed on the card or by any other suitable means]; or (b) fed into a computer where the information for subsequent comparison with the card is used and read at some later time.

Figure 18A:
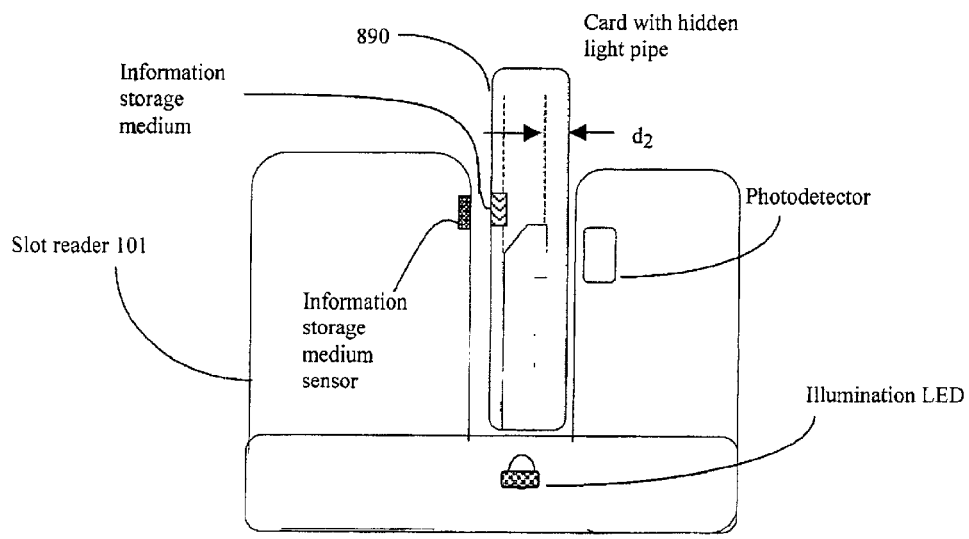
FIGS. 18A and 18B are cross sectional views of a slot reader for reading cards embodying the invention.
Figure 18B:
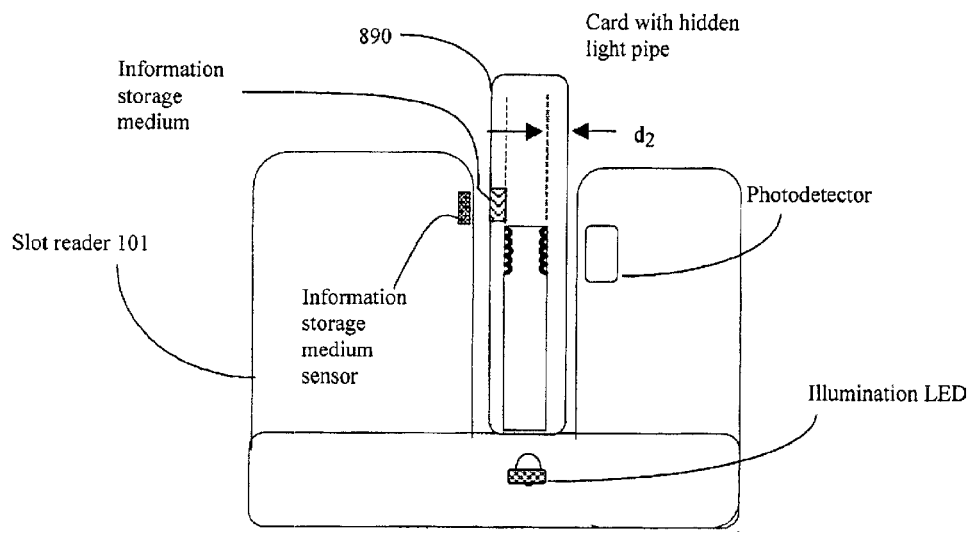

As shown in FIGS. 18A and 18B, a card 890 formed with a plurality of "hidden" light pipes, with the information pertaining to the pipes being encoded on the card, may be inserted in a slot reader 101. The reader includes means for sensing the optical pattern and may also include a sensor to sense the data in the information storage medium pertaining to the pattern. The reader 101 compares the two readings to determine the validity of the card.

Figure 19A:
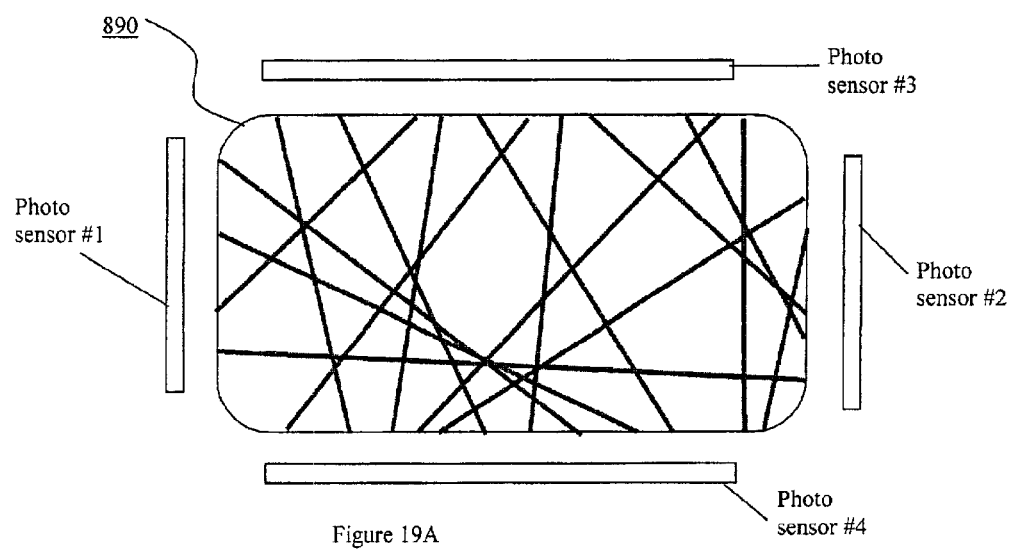
FIGS. 19A and 19B are, respectively, a top view and a cross-sectional view of a card with randomly placed optical fibers in accordance with the invention.

There may be more than one layer of light pipes between the top and bottom surfaces of the card. As shown in FIG. 19A, different light pipes may be distributed randomly or arbitrarily at numerous different angles to produce numerous different cards.

Figure 19B:
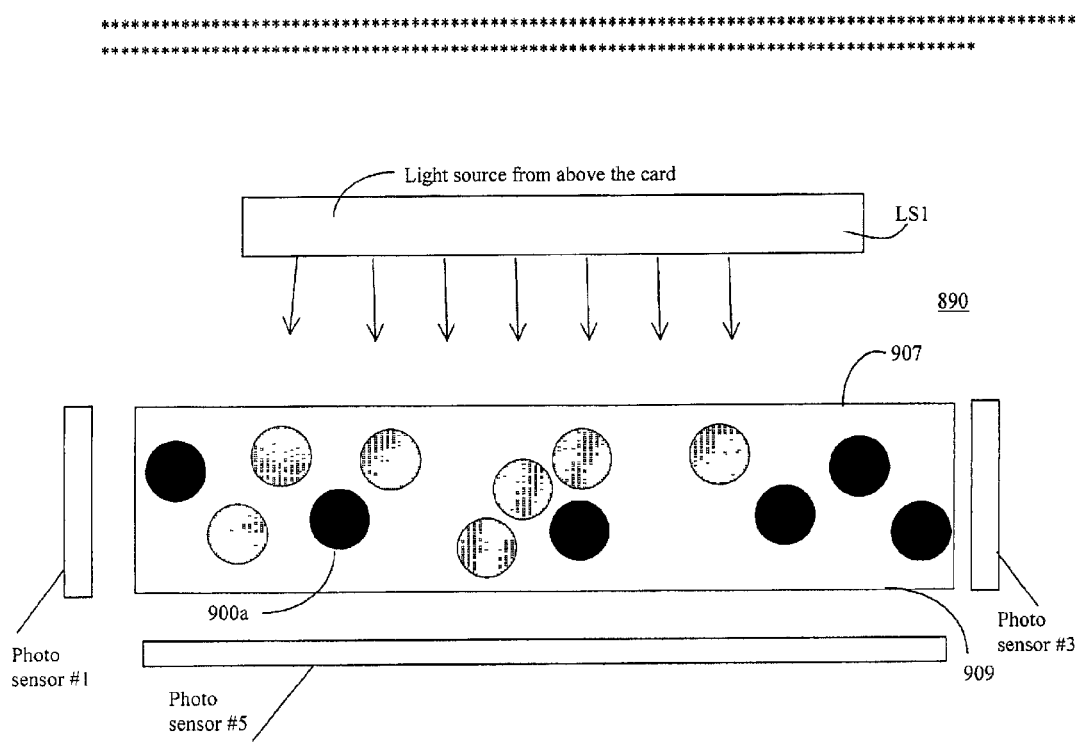

FIG. 19A is a top view of optic fibers or light pipes randomly placed between the top and bottom surfaces of a card 890. In FIG. 19A, the optic fibers are shown to extend between two edges of the card. FIG. 19B is a cross sectional view of a card, formed as shown in FIG. 19A, showing that various layers of randomly placed optical fibers/pipes can be placed between the top and bottom surfaces of the card. Each fiber/pipe (900,900*a*) extends between two edges of the card. Where the thickness of the card is two or three times the diameter of the optic fibers two or three layers of optic fibers can be randomly placed between the top and bottom surfaces of the card. The pattern created by the randomly placed optic fibers/pipes can be sensed in several ways as follows, as illustrated in FIGS. 19*a* and 19B:

1—One side of the card can be illuminated (e.g., via light source LS1 in FIG. 19B) and (a) the light emanating from any of the other three sides of the card can be sensed by means of photosensors (1,2,3,4,5 in FIGS. 19A and 19B) located opposite any of the three sides; and/or (b) the light emanating from the top and bottom surfaces of the card can be sensed.

2—One of the top and bottom surfaces of the card can be illuminated and (a) the light emanating from any of the four sides of the card can be sensed; and/or (b) the light emanating from the other one of the top and bottom surfaces can be sensed.

Sensing of the top and bottom surfaces can be accomplished by means of a linear array or an area array of photo sensors, such as a CCD array. The output pattern produced in response to an illumination signal may be similar to that shown in FIG. 10B—although the resulting pattern may be more complex than the FIG. 10B showing. The output pattern is sensed by a linear or area imaging array and the sensed signals are then processed to produce a digital or analog signal corresponding to the sensed signal(s) and to the underlying pattern. This digital or analog signal, indicative of selected characteristics of the pattern, may then be encoded and may be termed a "security code" which may be stored on the card or in a central computer. The security code may be stored on the card by imparting the corresponding information on a magnetic stripe located on the card, by storing the information in a semiconductor memory chip located on the card, by writing a bar code onto the card at a predetermined location, or by any other similar means for storing data. Subsequently, when the card is about to be used, the card is illuminated and the security code is read and compared with the light pattern output. Then, if there is a match the card is validated.

Instead of storing the security code on the card, the security code may be stored in a central computer which is accessed each time the card is about to be used. That is, when the card is about to be used, the card is illuminated and the light signals are sensed. These signals are then compared with the security code corresponding to the card which is stored in the computer. If the data checks out the card is validated.

It should be appreciated that each card formed in accordance with the invention, as illustrated in FIG. 19A, is formed in a truly random manner. This makes it nearly impossible for forgers to copy and/or falsify these cards.

As shown in FIGS. 18A, 18B, 19A, and 19B, either "pitted" optical fibers 900*a* and/or "non-pitted" optical fibers 900 may be used to form random arrangements in accordance with the invention.

As noted above, the inventive concepts described for impeding the counterfeiting of cards, instruments, and documents are also applicable to systems for impeding the counterfeiting of optical data storage discs. Optical data storage discs include compact discs (CD's) which provide, among others, a read-only-memory (ROM) function. The optical data storage disc includes a layer of transparent material formed over one side of the disc with a pattern of indentations defining digital data. This one side of the disc may be covered with a thin coating of reflective material. The digital data is then optically read in any suitable manner (e.g., from the opposite side of the disc).

There is a significant problem associated with the counterfeiting of the information contained on discs, whether the information is in the form of digital data, applications programs, music, etc. A counterfeiter can replicate any existing CD and sell the CD containing the information for 10%, or even less, of the retail price. This sharply cuts into the profits of the legitimate suppliers of the disc.

Applicants' invention is directed to forming security features on a CD and encoding these features on the CD so that these features can be crosschecked to validate the CD. This is best explained with reference to FIG. 20.

Figure 20A:
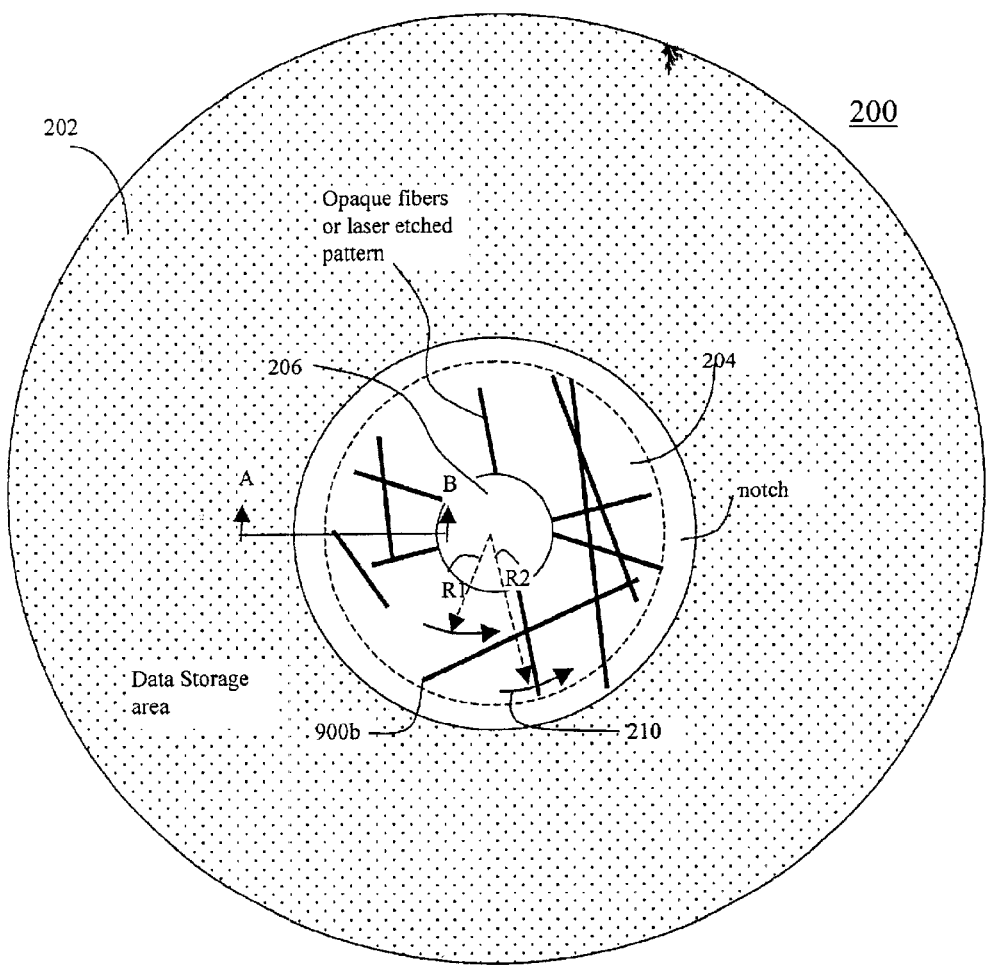
FIG. 20A is a top view of a compact disc (CD) embodying the invention.

FIG. 20 is a top view of a CD ROM 200 having an outer annular region 202 for the storage of information, an inner annular region 204, closer to the center of the disc, and a center region 206 which normally contains an opening such as a hole. The inner region 204 is normally blank and may be translucent.

In accordance with one aspect of the invention, hair like opaque strands 900*b* may be formed within region 204. These optical strands may be optical fibers of different colors for providing different spectral responses (or other suitable light pipes). The strands 900*b* may be formed, or placed, within the annular region 204 such that they either: (a) lie horizontally between the top and bottom surfaces of the disc, or along a disc surface, parallel to the surface of the disc; or (b) are mounted vertically between the top and bottom surfaces of the disc.

In accordance with the invention the strands 900*b* may be placed and positioned within translucent region 204 in several ways, some of which are as follows:

(a) randomly formed or placed within the region 204; or
(b) arranged within the region 204 in an arbitrary and/or programmed manner to produce a unique or predetermined pattern.

In accordance with another aspect of the invention, a plurality of marks, also identified by the reference numeral 900*b*, may be etched, scribed or burned (e.g., chemically or via a laser) into region 204. These marks 900*b* may be formed in a unique manner or they may be formed arbitrarily, or in accordance with some program. Thus, the CD ROM may be formed with a unique pattern located within the translucent region 204 with either laser etching or by embedding opaque fibers. A large number of different patterns can be generated in this manner. Also, the pattern may be formed at the formation of the CD ROM.

Figure 20B:
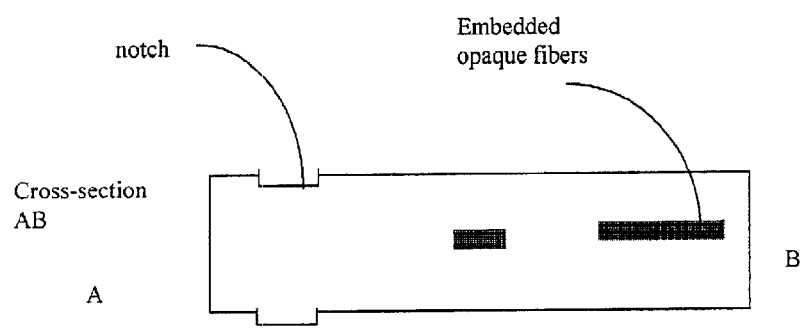
FIG. 20B is a cross-sectional drawing of part of CDROM in FIG. 20A when opaque fibers are embedded in region 204.
Figure 20C:
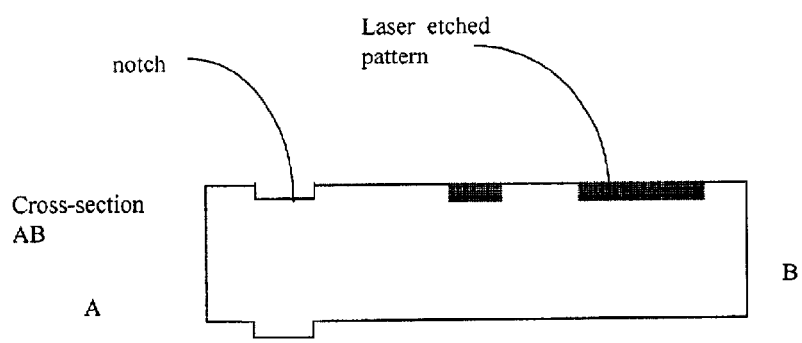
FIG. 20C is a cross-sectional drawing of part of CDROM in FIG. 20A when "marks" are laser etched on the surface in region 204.
Figure 21:
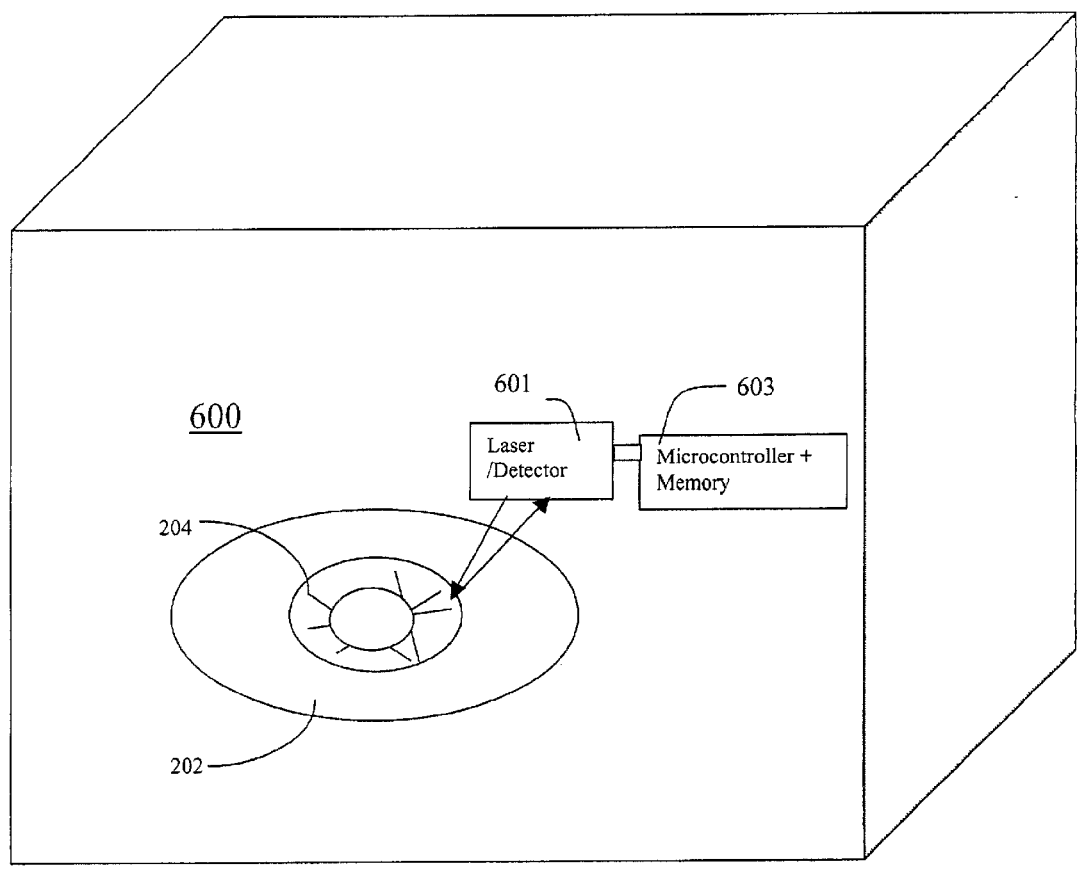
FIG. 21 is a highly simplified diagram of a reader/writer for use with disc's embodying the invention.

As a finishing step in the manufacture of the CD, the CD may be placed in a CD reader/writer 600 as shown in FIG. 21. The signal or spectral pattern resulting from illuminating the optical strand pattern (see FIG. 20B) or the optical marks pattern (see FIG. 20C) in region 204 may be read. FIG. 21 shows a laser/detector 601 which can illuminate the disc and the detect light reflected form the disc. It should be appreciated that when the CD is being read that the reader 600 may be programmed to read only a certain section or sector of the disc (e.g., region 210 in FIG. 20) and to record pattern information for that sector. Alternatively, the reader 600 may be programmed to scan the pattern sensed along a radius R1 or a radius R2 as shown in FIG. 20. The signals corresponding to the pattern read are then encoded within a specified area of region 202. Note that this permits the pattern formed on one disc to be made the same as the one formed on another disc. But, by programming the reading of different sections (e.g., by scanning along different radii, R1, R2) of the discs provide a different code to be stored and to be searched for. Interestingly, even if two optical patterns formed on two different discs are the same, by programming scanning of the disc at different radii makes the generation of the security code virtually unique even for apparently like optical patters. Each different radius forms a unique pattern. This pattern may then be used to generate a "unique security code" for the CD ROM. The corresponding information is then encoded and written onto the CD ROM as a hidden file. The information stored in the hidden file is related to the specific radius of the scan and the particular pattern scanned at the programmed radius.

By way of example, as a CD spins within the CD reader/writer, a laser photo detector 601 scans the translucent region 204. The laser scanner 601 and associated signal processing circuitry 603 calculate a "security code" (i.e., the "fingerprint") associated with the pattern read and determines the "fingerprint" placed on the disc. The "fingerprint" parameter is then written onto the CD, preferably in region 202, as an "hidden" file.

Subsequently when the CD is loaded into an appropriate reading device, the device reads the "hidden" file in region 202. The device can then read (sense) the pattern in region 204 and verify whether the pattern it reads matches the "fingerprint" parameter stored in the hidden file. The pattern formed in region 204 of the disc may be read by the same laser/photodetector circuitry that is used for reading the CD ROM information in region 202. A requirement is that the laser/photodetector be able to scan the region 204 as well as the region 202. If the two regions can not be read with a single laser, then existing equipment would be modified to provide a second laser/photodetector arrangement to scan both regions 202 and 204. When a CD ROM is placed into a reader one of the first steps in validating the CD ROM is to verify whether the security code stored in the hidden file is consistent with the scanned pattern at the programmed scan radius. The validation step may be programmed into the disc or into a reader (e.g. 600) or a combination of both.

What is claimed is:

1. A method for impeding a counterfeiting of an instrument having top and bottom surfaces defining a space therebetween comprising the step of:
    forming a random optical pattern in one of (a) said top surface, (b) said bottom surface and (c) the space between said top and bottom surfaces, for producing an instrument having an optical pattern which is extremely difficult to duplicate, whereby said random optical pattern and corresponding spectral response are normally different than an optical pattern and a spectral response of any other instrument.

2. A method as claimed in claim 1 wherein the instrument is an optical data storage disc having a region which is translucent and wherein the step of forming random optical patterns includes distributing a multiplicity of strands randomly between the top and bottom surfaces within said translucent region.

3. A method as claimed in claim 2 wherein the strands are opaque fibers.

4. A method as claimed in claim 1 wherein the instrument is an optical data storage disc having a region which is translucent and wherein the step of forming random optical patterns includes etching or laser burning a multiplicity of randomly selected points on one of the top and bottom surfaces within said translucent region.

5. A method as claimed in claim 1 wherein said instrument is an optical data storage disc having a first annular region extending a given distance from the center of the disc and having a second annular region extending between the first annular region and the edge of the disc, wherein said first annular region is translucent and said second annular region is for the storing of data to be read; and wherein the step of forming random patterns includes the step of distributing a multiplicity of strands randomly between the top and bottom surfaces within said first annular region.

6. A method as claimed in claim 5 wherein said strands are opaque fibers.

7. A method as claimed in claim 1 wherein said instrument is an optical data storage disc having a first annular region extending a given distance from the center of the disc and having a second annular region extending between the first annular region and the edge of the disc, wherein said first annular region is translucent and said second annular region is for the storing of data to be read; and wherein the step of forming random patterns includes the step of etching or laser burning a multiplicity of randomly selected points on one of the top and bottom surfaces within said translucent region.

8. A method as claimed in claim 1 further including the steps of:
    illuminating the instrument for producing a signal pattern indicative of the random pattern within the instrument;
    sensing the signal pattern corresponding to the random pattern; and
    encoding information corresponding to the signal pattern on an information storage medium located on the instrument.

9. The method as claimed in claim 1 wherein the instrument includes a portion for storing data and wherein the step of forming the optical pattern on or within the instrument occurs simultaneously with the step of writing data into the portion of the instrument intended for the storing of data.

10. A method as claimed in claim 1 wherein said instrument is an optical data storage disc having a first annular region extending a given distance from the center of the disc and having a second annular region extending between the first annular region and the edge of the disc, wherein said first annular region is translucent and said second annular region is for the storing of data to be read; and wherein the step of forming random optical patterns in one of (a) said top surface, (b) said bottom surface and (c) the space between said top and bottom surfaces occurs at the same time as the step of writing data to be stored; the random optical patterns being formed within the first annular region and the data to be stored being written in the second annular region.

11. In an optical data storage disc having a central region with a first translucent annular region surrounding the central region and having a second region surrounding the first region, said second region for storing information to be read by a reading device, the improvement comprising:

a random optical pattern formed within said first region for producing a disc which is extremely difficult to duplicate and having a spectral response within the first translucent region of the disc which is generally different from an optical pattern and a spectral response of any other disc.

12. In an optical data storage disc as claimed in claim 11, wherein information pertaining to the random optical pattern present in the first translucent region is stored in the second data storage region.

13. In combination with an optical data storage disc as claimed in claim 11 further including:

means for sensing selected characteristics of the random optical pattern formed in the first region and encoding data corresponding thereto within said second region of the disc; and means for subsequently sensing the pattern formed within the first region and for reading the corresponding encoded data within the second region to validate the disc.

14. In an optical storage disc as claimed in claim 11 wherein the random optical pattern is formed within said first region at the same time as the storing of information into said second region.

15. A combination for impeding a counterfeiting of an optical data storage disc comprising:

an optical data storage disc having a central region with a first translucent annular region surrounding the central region and having a second region surrounding the first region, said second region for storing information to be read by a reading device;

means for forming a random optical pattern within said first region;

means for sensing selected characteristics of the random optical pattern formed in the first region and encoding data corresponding thereto within said second region of the disc; and means for subsequently sensing the pattern formed within the first region and for reading the corresponding encoded data within the second region to validate the disc.

16. A combination as claimed in claim 15 wherein said means for forming a random optical pattern within said first annular region includes the placement of opaque strands within said first region.

17. A combination as claimed in claim 15 wherein said optical disc has top and bottom surfaces, and wherein the random optical pattern is formed between the top and bottom surfaces.

18. A combination as claimed in claim 15 wherein said means for forming a random optical pattern within said first annular region includes one of etching and laser scribing selected portions of the first annular region of the disc.

19. A combination as claimed in claim 15 wherein the random optical pattern is formed within said first region at the same time as information to be read is stored in the second region.

20. A system for impeding a counterfeiting of an optical data storage disc comprising: an optical data storage disc having a central region with a first translucent annular region surrounding the central region and having a second region surrounding the first region, said second region for storing information to be read by a reading device;

means for forming a random optical pattern within said fist region which is extremely difficult to duplicate;

means for sensing selected characteristics of the random optical pattern formed within the first region and encoding data corresponding thereto within said second region of the disc; and means for subsequently sensing the pattern formed within the first region and for reading the corresponding encoded data within the second region to determine the validity of the disc.

21. A system as claimed in claim 20 wherein said means for forming an a random optical pattern within said first annular region includes the placement of opaque strands within said first region.

22. A system as claimed in claim 20 wherein said means for forming random optical pattern within said first annular region includes one of etching and laser scribing selected portions of the first region.

23. A system as claimed in claim 20 wherein said information to be read by said reading device is introduced into the disc at the same time as the random optical pattern is formed in said first region.

* * * * *